United States Patent
Ahn

(10) Patent No.: US 7,339,631 B2
(45) Date of Patent: Mar. 4, 2008

(54) APPARATUS AND METHOD FOR CORRECTING COLOR ERROR

(75) Inventor: Sang Jin Ahn, Goomi-si (KR)

(73) Assignee: LG Electronics Inc., Seoul (KR)

( * ) Notice: Subject to any disclaimer, the term of this patent is extended or adjusted under 35 U.S.C. 154(b) by 543 days.

(21) Appl. No.: 11/053,857

(22) Filed: Feb. 10, 2005

(65) Prior Publication Data
US 2005/0179824 A1 Aug. 18, 2005

(30) Foreign Application Priority Data
Feb. 12, 2004 (KR) ............... 10-2004-0009175

(51) Int. Cl.
*H04N 9/12* (2006.01)
(52) U.S. Cl. .................................. 348/743
(58) Field of Classification Search ............ 348/743, 348/742, 739, 68–71, 268, 269, 503, 756; 353/31
See application file for complete search history.

(56) References Cited

U.S. PATENT DOCUMENTS

| | | | |
|---|---|---|---|
| 5,365,283 A * | 11/1994 | Doherty et al. ............. 348/743 |
| 5,528,317 A * | 6/1996 | Gove et al. .................. 348/743 |
| 5,657,099 A * | 8/1997 | Doherty et al. ............. 348/743 |
| 5,691,780 A * | 11/1997 | Marshall et al. ............ 348/743 |
| 5,774,196 A * | 6/1998 | Marshall ...................... 348/743 |
| 5,880,573 A * | 3/1999 | Marshall et al. ............ 318/805 |
| 6,054,832 A * | 4/2000 | Kunzman et al. ........... 318/600 |
| 6,324,006 B1 * | 11/2001 | Morgan ........................ 359/618 |
| 6,726,333 B2 * | 4/2004 | Huibers et al. ................ 353/84 |
| 7,046,221 B1 * | 5/2006 | Malzbender .................. 345/82 |
| 7,139,040 B2 * | 11/2006 | Marshall ...................... 348/743 |
| 2001/0043289 A1 | 11/2001 | Marshall |
| 2002/0003704 A1 | 1/2002 | Ohmae et al. |

* cited by examiner

*Primary Examiner*—Paulos M. Natnael
(74) *Attorney, Agent, or Firm*—Birch, Stewart, Kolasch & Birch, LLP

(57) ABSTRACT

An apparatus and method for correcting a color error are provided. The apparatus includes, a color wheel having a CWIM marked thereon, a motor for rotating the color wheel, a motor driver for controlling a driving of the motor, a CWIM sensor for sensing the CWIM to generate a CWIM sensing signal, and a controller for setting a leading edge of the CWIM sensing signal as a reference location and controlling the motor driver to adjust a phase difference between the CWIM sensing signal and a synchronization signal of an image signal.

14 Claims, 5 Drawing Sheets

APPARATUS AND METHOD FOR CORRECTING COLOR ERROR

BACKGROUND OF THE INVENTION

1. Field of the Invention

The present invention relates to an apparatus and method for correcting a color error, and more particularly, to an apparatus and method for correcting a color error in a DLP system, which is capable of correcting the color error caused by temperature change.

2. Description of the Related Art

Recently, an image display device has been lightweight, slim and large-sized. Also, as a projection TV having a large-sized screen is manufactured at a low cost, its demand is increasing.

The projection TV projects an enlarged image on a screen, allowing a user to view a large-sized image.

Such a projection TV includes a cathode ray tube (CRT) projection TV, a liquid crystal display (LCD) projection TV, a digital light processing (DLP) TV, and so on.

Among them, a digital micromirror display (DMD) developed by Texas Instruments Incorporated is mounted on the DLP projection TV. Thus, the DLP projection TV can solve the disadvantages of the LCD projection TV that employs a thin film transistor (TFT) LCD. That is, the DLP projection TV can remove mosaic occurring in pixels and improve a reproducibility of an original color. Also, the DLP projection TV has a wide viewing angle and a high contrast ratio and can obtain a large-sized image having high-brightness and high-definition. For these reasons, the DLP projection TV is spotlight.

The DMD used in the DLP projection TV includes about nine hundred thousand micromirrors or more, which can be individually controlled.

A white light emitted from a lamp is converted into RGB primary colors through a color wheel coated with RGB color filters. The RGB primary colors are reflected according to motions (±15°) of the respective pixels contained in the DMD, thereby displaying an image on a screen.

A structure and an operation principle of the color wheel used in the DLP system will be described below with reference to FIG. 1.

Referring to FIG. 1, the color wheel 120 used in the DLP system includes a total of six segments, two segments each for R, G and B.

A motor 122 rotates the color wheel 120 according to a synchronization signal of an image signal, such that the white light emitted from the lamp is converted into R, G and B lights.

In order to accurately control the driving state of the color wheel 120, a color wheel index mark (CWIM) is marked on the color wheel 120. Also, a sensor 124 for sensing the CWIM is installed in the motor 122.

Since the CWIM sensing signal sensed by the sensor 124 represents a rotating speed and a rotating state of the color wheel 120, the color wheel 120 can outputs R, G and B lights matched with the synchronization signal of the image signal by detecting a phase difference between the CWIM sensing signal and the synchronization signal and controlling the driving state of the motor 122 according to the detected phase difference.

A method for controlling the color wheel 120 will be described below with reference to FIG. 2.

For the sake of convenience, the DLP system can be divided into an optical engine part and a data processing part.

The data processing part 100 includes a microprocessor 102, a memory 104, a data formatter 106, a phase difference detector 108, an index delay setup unit 110, and a pulse width modulation (PWM) control signal generator 112.

The optical engine part includes a DMD 114, a prism 116, a lamp 118, a color wheel 120, a motor 122, a sensor 124, a motor driver 126, a projection lens 128, a screen 130, and a ballast controller 132.

The microprocessor 102 controls an overall operation of the optical engine part and the data processing part 100 in the DLP system, and the memory stores a processing program of the microprocessor 102 and a variety of information.

The data formatter 106 encodes an image data and a synchronization signal into PWM bit sequence signals, which allows the DMD 114 to be driven. The data formatter 106 transmits the PWM bit sequence signal to the DMD 114.

The micromirror of the DMD 114 is turned on/off in response to the PWM bit sequence signal. An angle of the micromirror is shifted by ±15°, depending on the on/off states.

The color wheel 120 converts the light emitted from the lamp into R, G and B lights and provides the R, G and B lights to the DMD 114.

The prism 116 provides the lights passing through the color wheel 120 to the DMD 114. The micromirrors of the DMD 114 reflect the lights passing through the prism 116 to the projection lens 128, depending on the on/off states.

The projection lens 128 enlarges the lights provided from the DMD 114 and displays them to the screen 130. In this manner, the image is displayed on the screen 130.

Here, when the micromirrors are in the on-state, the light incident from the prism 116 is reflected within an effective screen. Meanwhile, when the micromirrors are in the off-state, the light incident from the prism 116 is reflected out of the effective screen.

The ballast controller 132 supplies a driving power to the lamp 118 under the control of the microprocessor 102.

The sensor 124 includes a photo sensor and a signal converter. The photo sensor senses the CWIM marked on the color wheel 120 so as to sense the driving state of the color wheel 120. Then, the signal converter converts the CWIM sensing signal into a digital signal and provides it to the index delay setup unit 110 and the microprocessor 102.

The index delay setup unit 110 delays the CWIM sensing signal under the control of the microprocessor 102 and provides the delayed signal to the phase difference detector 108.

The phase difference detector 108 detects the phase difference between the synchronization signal and the CWIM signal by comparing them, and provides the detected phase difference to the PWM control signal generator 112.

The PWM control signal generator 112 receives the phase difference information and generates a PWM control signal for correcting the phase difference to the motor driver 126.

The motor driver 126 drives the motor 122 to rotate the color wheel 120.

Like this, the related art DLP system can correctly reproduce the colors of the image signal by adjusting the phase difference between the synchronization signal and the CWIM sensing signal.

However, in the process of sensing the CWIM marked on the color wheel 120 and converting the CWIM sensing signal into the digital signal, the CWIM sensing signal is influenced by the temperature change.

That is, since the CWIM sensing signal is influenced by the temperature change, an error occurs in the rotating speed and the phase of the color wheel when the internal temperature changes, resulting in a color error.

SUMMARY OF THE INVENTION

Accordingly, the present invention is directed to an apparatus and method for correcting a color error that substantially obviate one or more problems due to limitations and disadvantages of the related art.

An object of the present invention is to provide an apparatus and method for correcting a color error, which are capable of preventing the color error occurring when characteristic of a sensing signal serving as a reference of a rotating speed and phase of a color wheel is varied due to a temperature change.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for correcting a color error includes: a color wheel having a CWIM (color wheel index mark) marked thereon; a motor for rotating the color wheel; a motor driver for controlling a driving of the motor; a CWIM sensor for sensing the CWIM to generate a CWIM sensing signal; and a controller for setting a leading edge of the CWIM sensing signal as a reference location and controlling the motor driver to adjust a phase difference between the CWIM sensing signal and a synchronization signal of an image signal.

In another aspect of the present invention, an apparatus for correcting a color error includes: a color wheel having a CWIM marked thereon; a motor for rotating the color wheel; a motor driver for controlling a driving of the motor; a CWIM sensor for sensing the CWIM to generate a CWIM sensing signal; a temperature sensor for sensing an internal temperature of a DLP system; and a controller for compensating for the CWIM sensing signal depending on the sensed internal temperature, setting the compensated CWIM sensing signal as a reference location of the color wheel, and controlling the motor driver to adjust a phase difference between the compensated CWIM sensing signal and a synchronization signal of an image.

In a further another aspect of the present invention, a method for correcting a color error includes the steps of: sensing a CWIM marked on a color wheel to generate a CWIM sensing signal; sensing a leading edge of the CWIM sensing signal; detecting a phase difference between the leading edge of the CWIM sensing signal and a synchronization signal of an image signal; and controlling a driving of a motor for rotating the color wheel to compensate for the phase difference.

In a still further another aspect of the present invention, a method for correcting a color error includes the steps of: sensing a CWIM marked on a color wheel to generate a CWIM sensing signal; sensing an internal temperature of a DLP system; adjusting the CWIM sensing signal depending on the internal temperature; setting the adjusted CWIM sensing signal as a reference location of the color wheel and detecting a phase difference between the CWIM sensing signal and a synchronization signal of an image signal; and controlling a driving of a motor for rotating the color wheel to compensate for the phase difference.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
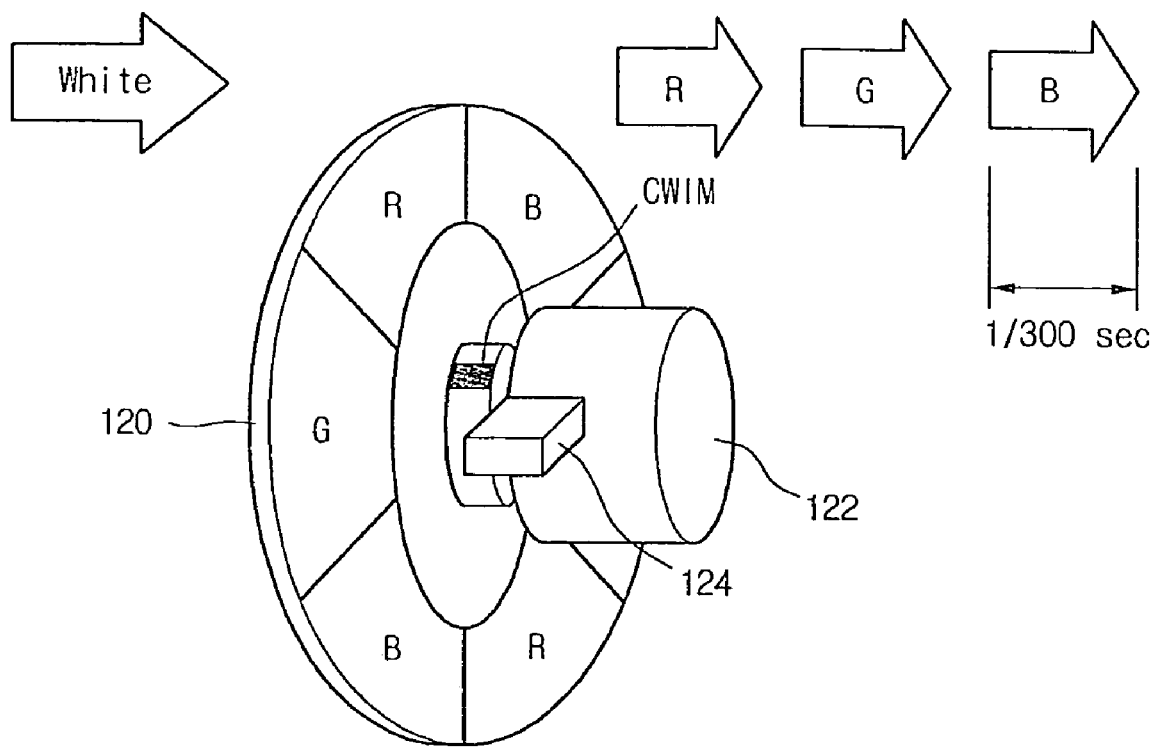
FIG. 1 is a view illustrating a structure and an operation of a color wheel in a DLP system.
Figure 2:
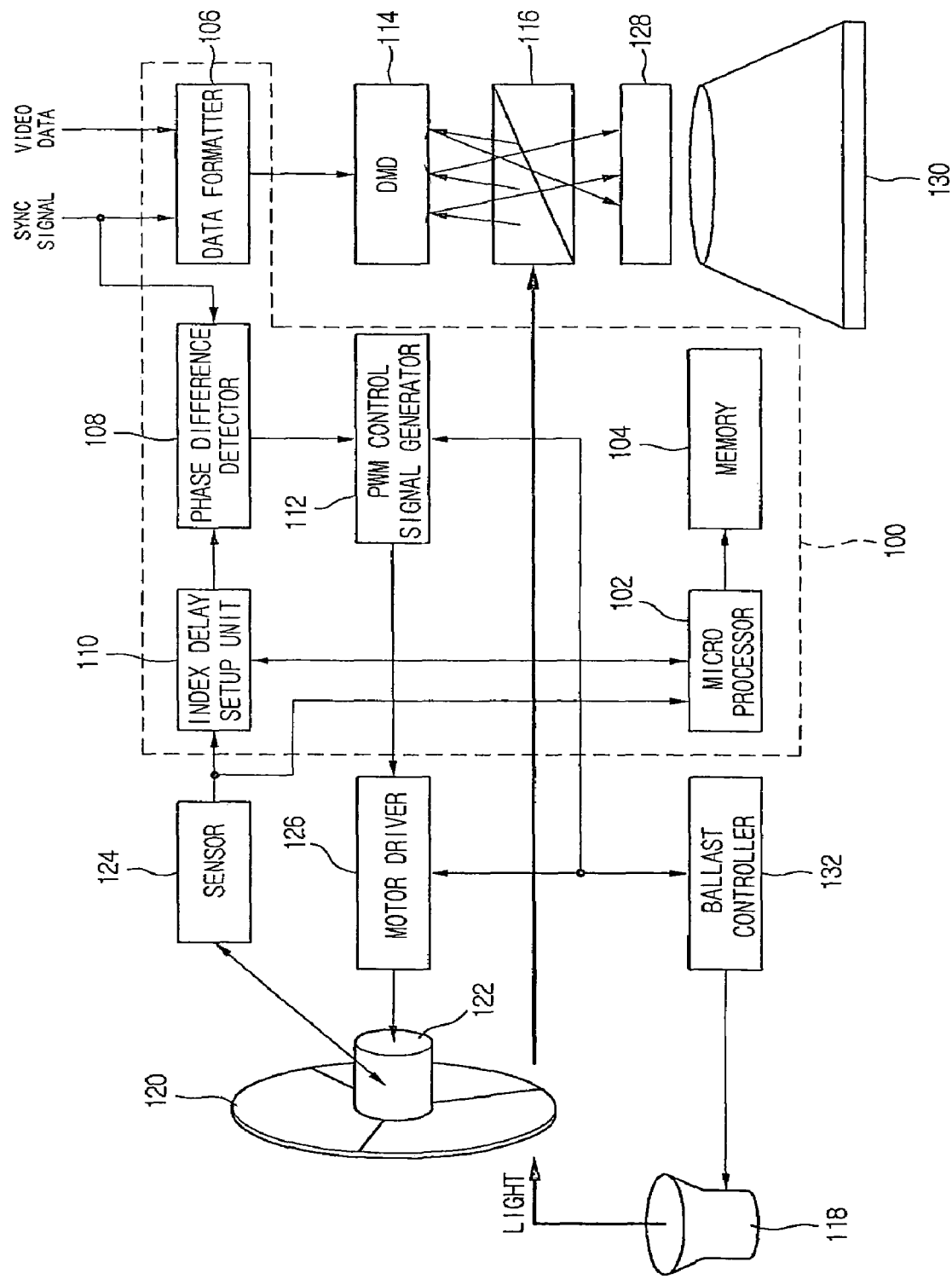
FIG. 2 is a view for explaining a control of a related art color wheel.
Figure 3:
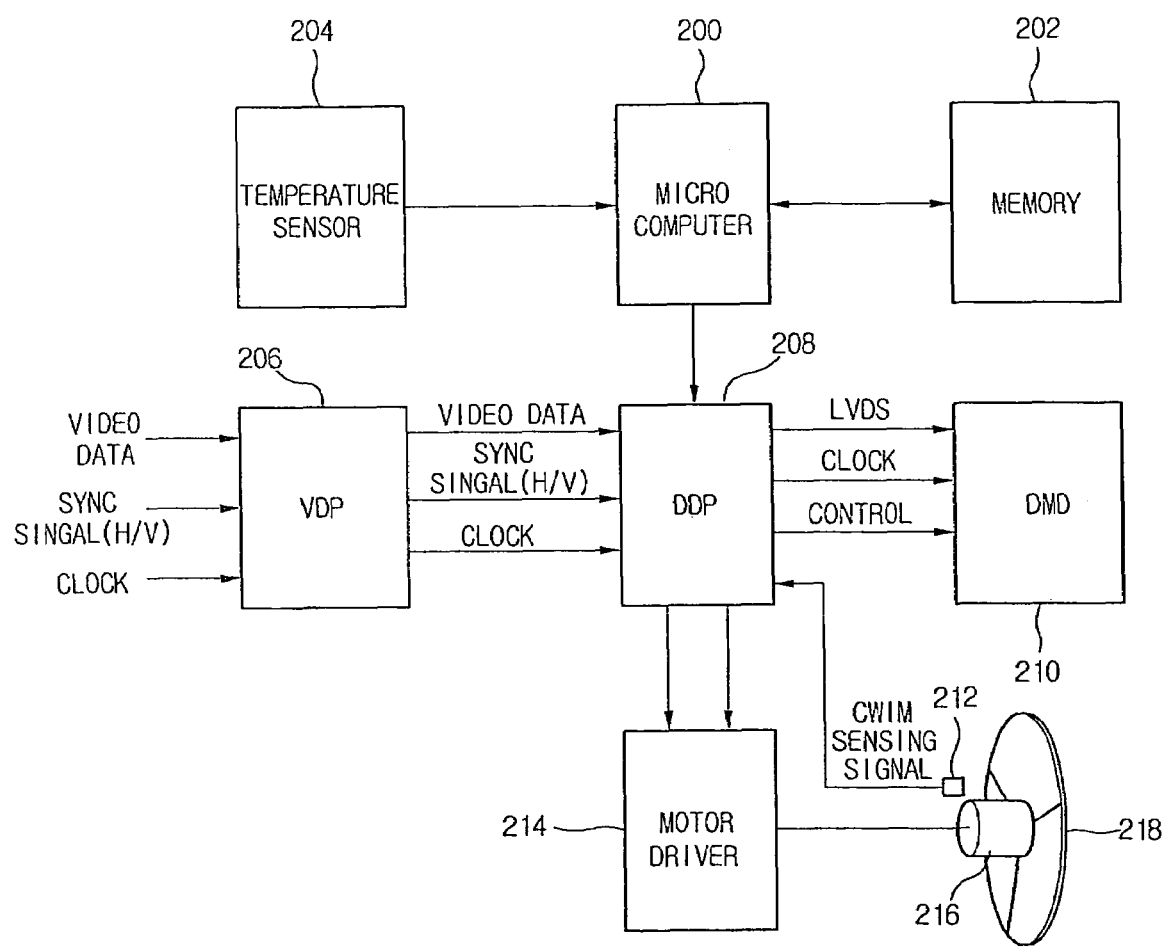
FIG. 3 is a view illustrating a structure of a DLP system according to the present invention.

FIG. 3 is a view illustrating a structure of a DLP system.

Referring to FIG. 3, the DLP system includes a microcomputer 200, a memory 202, a temperature sensor 204, a video data processor (VDP) 206, a digital data processor (DDP) 208, a DMD 210, a CWIM sensor 212, a motor driver 214, a motor 216, and a color wheel 218.

The microcomputer 200 controls an overall operation of the DLP system and controls a CWIM sensing signal according to the first and second embodiments of the present invention.

First, according to the first embodiment of the present invention, the microcomputer 200 controls the DDP 208 to set a leading edge of a CWIM sensing signal as a reference location of the color wheel 218, thus preventing a color error caused by a change of the CWIM sensing signal due to temperature change.

Figure 4:
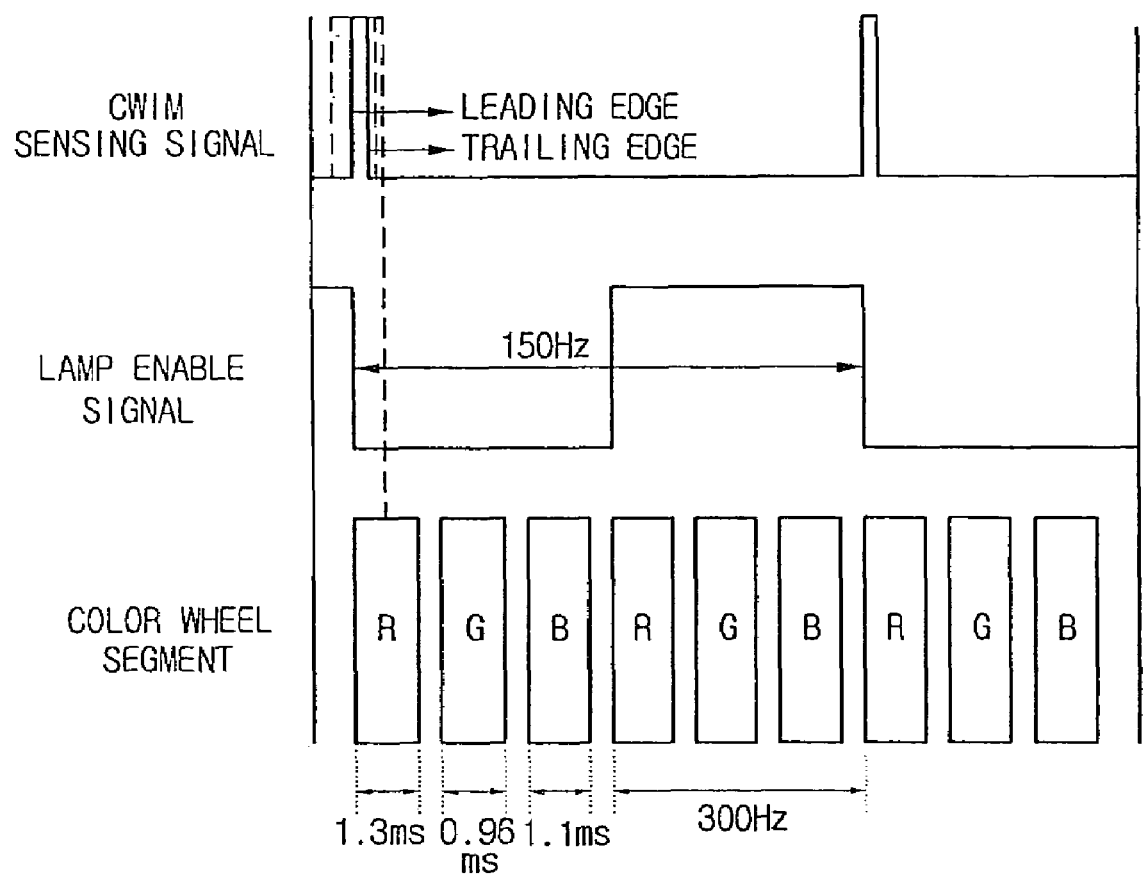
FIG. 4 is a view illustrating a relationship between a CWIM sensing signal and each segment of a color wheel according to a first embodiment of the present invention.

FIG. 4 is a view illustrating a relationship between the CWIM sensing signal and each segment of the color wheel according to a first embodiment of the present invention.

Referring to FIG. 4, the leading edge of the CWIM sensing signal corresponds to a start location of the R segment in the color wheel 218. Compared with a trailing edge, the leading edge is less influenced by temperature change.

The microcomputer 200 controls the DDP 208 to set the leading edge of the CWIM sensing signal as the reference location, thus preventing a color error caused by the change of the CWIM sensing signal due to the temperature change.

Also, according to a second embodiment of the present invention, the temperature sensor 204 provides a temperature sensing signal to the microcomputer 200, and the microcomputer 200 provides an internal temperature information corresponding to the temperature sensing signal to the DDP 208. Based on the internal temperature information, the DDP 208 controls the CWIM sensing signal provided from the CWIM sensor 212. Therefore, the change of the CWIM sensing signal depending on the temperature can be compensated.

The information about the change of the CWIM sensing signal depending on the temperature is obtained by the test and is previously stored or programmed as a compensation function.

The temperature sensor 204 senses the internal temperature of the DLP system and provides the temperature sensing information to the DDP 208.

The VDP 206 processes video data provided from a video source and provides the processed video data to a controller of the DLP driver, that is, the DDP 208.

The DDP 208 separates the image signal YCbCr provided from the VDP 206 into R, G and B lights by an analog-to-digital conversion, and divides the respective pixels into R, G and B values, such that the image signal is converted into data that can drive the DMD 210.

Then, the DDP 208 synchronizes the R, G and B lights passing through the color wheel 218 with a time point when the lights are projected on the DMD 210, and turns on/off the DMD 210 according to the pixel values of the respective colors.

Also, the DDP 208 detects the phase difference between the synchronization signal and the CWIM sensing signal and controls the motor driver 214 to compensate for the phase difference. Under the control of the microcomputer 200, the DDP 208 sets the leading edge as the reference location of the CWIM sensing signal or controls the CWIM sensing signal depending on the internal temperature information.

The CWIM sensor 212 is installed in the motor 200 to sense the CWIM marked on the color wheel 218 and provide the sensing signal to the DDP 208.

The motor 216 is a 3-phase DC motor and is connected to the color wheel 218. The motor 216 rotates the color wheel 218. Under the control of the DDP 208, the motor driver 214 for controlling the driving of the motor 216 controls a direction of current inputted/outputted to/from three terminals of the motor 216, so that the motor 216 can be rotated at a constant speed.

Figure 5:
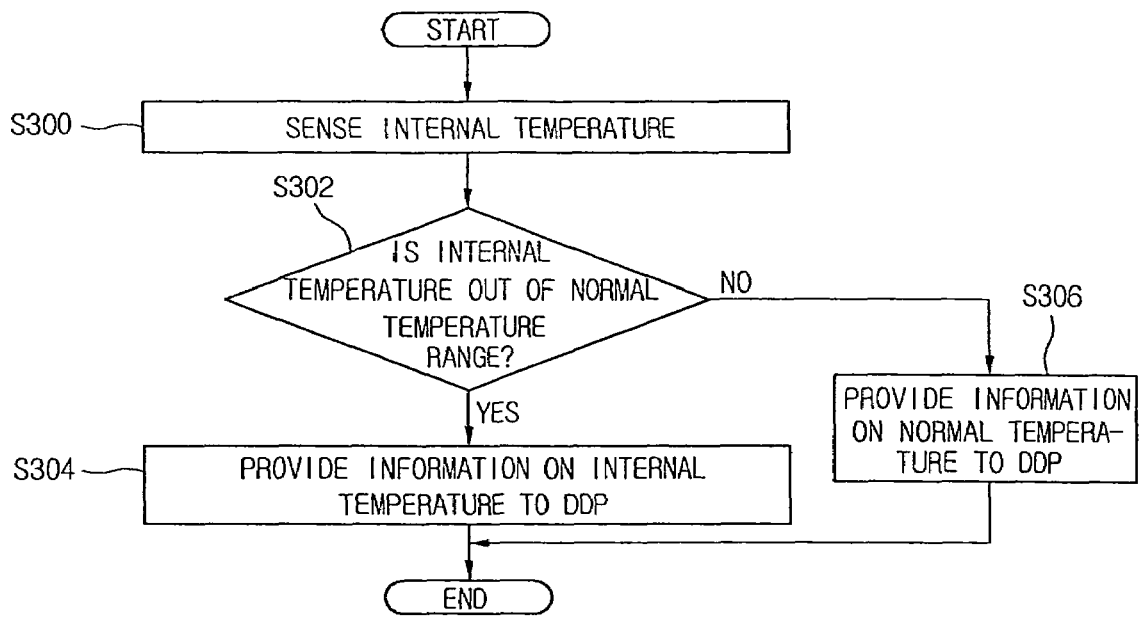
FIGS. 5 and 6 are flowcharts illustrating a method for controlling a CWIM sensing signal according to a second embodiment of the present invention.
Figure 6:
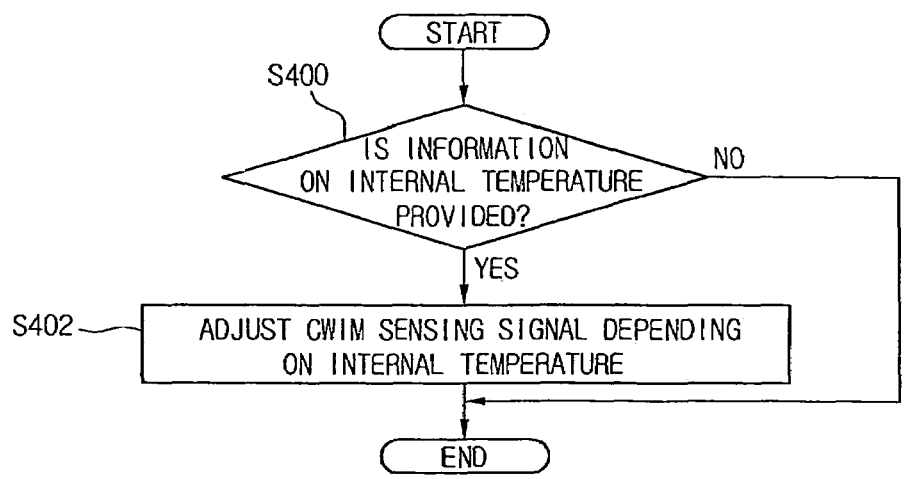

A method for controlling the CWIM sensing signal according to a second embodiment of the present invention will be described below with reference to FIGS. 5 and 6.

If the temperature sensor 204 senses the internal temperature and provides the temperature sensing signal to the microcomputer 200 (S300), the microcomputer 200 checks whether the internal temperature corresponding to the temperature sensing signal is out of a normal temperature range or is changed rapidly (S302).

If the internal temperature is out of the normal temperature range or is changed rapidly, the microcomputer 200 provides the information on the sensed internal temperature to the DDP 208 (S304).

If not, the microcomputer 200 provides the information on the normal temperature to the DDP 208 (S306).

Meanwhile, the DDP 208 checks whether or not the microcomputer 200 provides the information on the internal temperature (S400). If the microcomputer 200 provides the information on the internal temperature, the DDP 208 controls the CWIM sensing signal depending on the internal temperature (S402).

At this point, the step S402 can be performed using a previously defined compensation function or a compensation table based on the internal temperature.

Here, the compensation function can be previously programmed in the DDP 208, and the compensation table can be stored in the memory 202.

The compensation table can be defined as a compensation table based on temperature or a compensation table based on temperature change.

For example, assuming that an internal reference temperature is set to 27° C., if the internal temperature rises by 2° C., a value A is reflected on the CWIM sensing signal. On the contrary, if the internal temperature drops by 5° C., a value B is reflected on the CWIM sensing signal.

Also, if the internal temperature rises by 3° C. for 1 minute, a value C is reflected on the CWIM sensing signal. If the internal temperature rises by 2° C. for 1 minute, a value D is reflected on the CWIM sensing signal.

As described above, the CWIM sensing signal can be controlled depending on the temperature by reflecting the compensation values based on the internal temperature or the change of the internal temperature.

In the sensing signal that is the reference of the rotating speed and phase of the color wheel, the leading edge having a low error in the temperature change is used, thereby minimizing the color error.

In addition, the sensing signal that is the reference of the rotating speed and phase of the color wheel is controlled based on the internal temperature, there correcting the color error caused by the change of the CWIM sensing signal due to the temperature change.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for correcting a color error, comprising:
   a color wheel having a CWIM (color wheel index mark) marked thereon;
   a motor for rotating the color wheel;
   a motor driver for controlling a driving of the motor;
   a CWIM sensor for sensing the CWIM to generate a CWIM sensing signal; and
   a controller for setting a leading edge of the CWIM sensing signal as a reference location and controlling the motor driver to adjust a phase difference between the CWIM sensing signal and a synchronization signal of an image signal.

2. An apparatus for correcting a color error, comprising:
   a color wheel having a CWIM marked thereon;
   a motor for rotating the color wheel;
   a motor driver for controlling a driving of the motor;
   a CWIM sensor for sensing the CWIM to generate a CWIM sensing signal;
   a temperature sensor for sensing an internal temperature of a DLP system; and
   a controller for compensating for the CWIM sensing signal depending on the sensed internal temperature, setting the compensated CWIM sensing signal as a reference location of the color wheel, and controlling the motor driver to adjust a phase difference between the compensated CWIM sensing signal and a synchronization signal of an image.

3. The apparatus according to claim 2, wherein the controller sets a leading edge of the CWIM sensing signal as the reference location of the color wheel, and compensates for the CWIM sensing signal depending on the internal temperature.

4. The apparatus according to claim 2, wherein the controller compensates for the CWIM sensing signal based on a programmed compensation function.

5. The apparatus according to claim 2, further comprising a memory for storing a compensation table based on the internal temperature so as to the compensate for the CWIM sensing signal depending on the internal temperature sensed by the temperature sensor.

6. The apparatus according to claim 5, wherein the compensation table includes a compensation value based on a specific temperature.

7. The apparatus according to claim 5, wherein the compensation table includes a compensation value based on a temperature change.

8. A method for correcting a color error, comprising the steps of:
- sensing a CWIM marked on a color wheel to generate a CWIM sensing signal;
- sensing a leading edge of the CWIM sensing signal;
- detecting a phase difference between the leading edge of the CWIM sensing signal and a synchronization signal of an image signal; and
- controlling a driving of a motor for rotating the color wheel to compensate for the phase difference.

9. A method for correcting a color error, comprising the steps of:
- sensing a CWIM marked on a color wheel to generate a CWIM sensing signal;
- sensing an internal temperature of a DLP system;
- adjusting the CWIM sensing signal depending on the internal temperature;
- setting the adjusted CWIM sensing signal as a reference location of the color wheel and detecting a phase difference between the CWIM sensing signal and a synchronization signal of an image signal; and
- controlling a driving of a motor for rotating the color wheel to compensate for the phase difference.

10. The method according to claim 9, wherein a leading edge of the CWIM sensing signal is set as the reference location of the color wheel and the CWIM sensing signal is controlled depending on the internal temperature.

11. The method according to claim 9, wherein the internal temperature is inputted to a programmed compensation function and the CWIM sensing signal is controlled depending on an output value of the compensation function.

12. The method according to claim 9, wherein the CWIM sensing signal is adjusted depending on an output value of a compensation table based on the internal temperature.

13. The method according to claim 12, wherein the compensation table includes a compensation value based on a specific temperature.

14. The method according to claim 12, wherein the compensation table includes a compensation value based on a temperature change.

* * * * *